United States Patent
Kashiwagi et al.

(10) Patent No.: US 8,755,137 B2
(45) Date of Patent: Jun. 17, 2014

(54) DISK DRIVE AND METHOD FOR ARRANGING AND MANAGING CALIBRATION AREA IN DISK DRIVE

(75) Inventors: Kazuto Kashiwagi, Ome (JP); Takeyori Hara, Fuchu (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 69 days.

(21) Appl. No.: 13/550,960

(22) Filed: Jul. 17, 2012

(65) Prior Publication Data

US 2013/0188276 A1    Jul. 25, 2013

(30) Foreign Application Priority Data

Jan. 20, 2012    (JP) ................................. 2012-009795

(51) Int. Cl.
  *G11B 27/36*   (2006.01)
  *G11B 5/00*   (2006.01)
(52) U.S. Cl.
  USPC .......................................... 360/31; 369/47.53
(58) Field of Classification Search
  USPC ............ 369/47.5, 47.51, 47.52, 47.53, 53.24, 369/53.12, 53.14, 53.15; 360/75, 78.14, 360/77.06, 77.14, 31
  See application file for complete search history.

(56) References Cited

U.S. PATENT DOCUMENTS 7,453,781 B2 * 11/2008 Gushima et al. ........... 369/53.24
7,616,544 B2 * 11/2009 Miyashita et al. ......... 369/47.53

FOREIGN PATENT DOCUMENTS

JP          07-311942          11/1995

* cited by examiner

*Primary Examiner* — Nabil Hindi
(74) *Attorney, Agent, or Firm* — Knobbe, Martens, Olson & Bear LLP (57) ABSTRACT

According to one embodiment, there is provided a disk drive. In the disk drive, a calibration module calibrates a write condition using a first area in a sequential access area on a disk to which data is to be written next time as a calibration area if the calibration is required. A manager enters the calibration area in a management table in association with a physical address of the first area used as the calibration area. A sequential write module continues a sequential writing from a second area following the first area based on skipping the first area.

12 Claims, 6 Drawing Sheets

| Physical address (C1) | Logical address (C2) | Defect area (F1) (C3) | Calibration area (F2) (C4) |
|---|---|---|---|
| 00 | 100 | | |
| 01 | 101 | | |
| 02 | 102 | | |
| 03 | 103 | | |
| 04 | 104 | | |
| 05 | 105 | | |
| 06 | 106 | | |
| ⋮ | ⋮ | ⋮ | ⋮ |
| 29 | 129 | | |
| 2A | 12A | | |
| 2B | | | |
| 2C | | | |
| 2D | | | |
| 2E | | | |
| 2F | | | |

FIG. 4

| Physical address (C1) | Logical address (C2) | Defect area (F1) (C3) | Calibration area (F2) (C4) |
|---|---|---|---|
| 00 | 100 | | |
| 01 | 101 | | |
| 02 | | 1 | |
| 03 | 102 | | |
| 04 | 103 | | |
| 05 | 104 | | |
| 06 | 105 | | |
| ⋮ | ⋮ | ⋮ | ⋮ |
| 29 | 128 | | |
| 2A | 129 | | |
| 2B | 12A | | |
| 2C | | | |
| 2D | | | |
| 2E | | | |
| 2F | | | |

F I G. 7

DISK DRIVE AND METHOD FOR ARRANGING AND MANAGING CALIBRATION AREA IN DISK DRIVE

CROSS-REFERENCE TO RELATED APPLICATIONS

This application is based upon and claims the benefit of priority from prior Japanese Patent Application No. 2012-009795, filed Jan. 20, 2012; the entire contents of which are incorporated herein by reference.

FIELD

Embodiments described herein relate generally to a disk drive and a method for arranging and managing a calibration area in the disk drive.

BACKGROUND

In general, disk drives typified by magnetic disk drives use disks (that is, disk-like storage media) as storage media. In such a disk drive, data is concentrically or spirally written to a disk by a head. A recording area on the disk comprises, for example, blocks each of a predetermined data size which are referred to as sectors.

Each of the sectors has a unique physical address. The sectors each with a physical address include sectors that are used for writing of user data. A part of the sectors each with a physical address is used as a dedicated calibration area. The calibration area is used, for example, to adjust recording conditions for achieving the best quality of recording signals and a current supplied to a recording coil.

As described above, the calibration area is used to adjust optimum conditions for the access of the head to the sectors on the disk. Thus, the calibration area is preferably arranged close to the sectors on the disk which are accessed based on the conditions adjusted using the calibration area.

On the other hand, the disk drive frequently performs sequential access (for example, sequential writing typified by shingled writing). Depending on the positional relationship between the areas on the disk which are sequentially accessed and the calibration area, the position of the calibration area may affect the sequential access.

DETAILED DESCRIPTION

In general, according to one embodiment, a disk drive comprises a disk, a head, a management table, a calibration module, a manager, and a sequential write module. The disk has a sequential access area to which data of a first size is sequentially written. The sequential access area has a second size larger than the first size. The head is used to concentrically or spirally write data to the disk. The management table is configured to associate a calibration area used to calibrate a write condition for writing data to the disk by the head, with a physical address of the calibration area. The calibration module is configured to calibrate the write condition using a first area to which data is to be written next time as the calibration area if the calibration is required during the sequential writing. The manager is configured to manage a state in which the first area is used as the calibration area by entering the calibration area in the management table in association with a physical address of the first area. The sequential write module is configured to continue the sequential writing by the head from a second area based on skipping the first area used as the calibration area. The second area follows the first area within the sequential access area.

Figure 1:
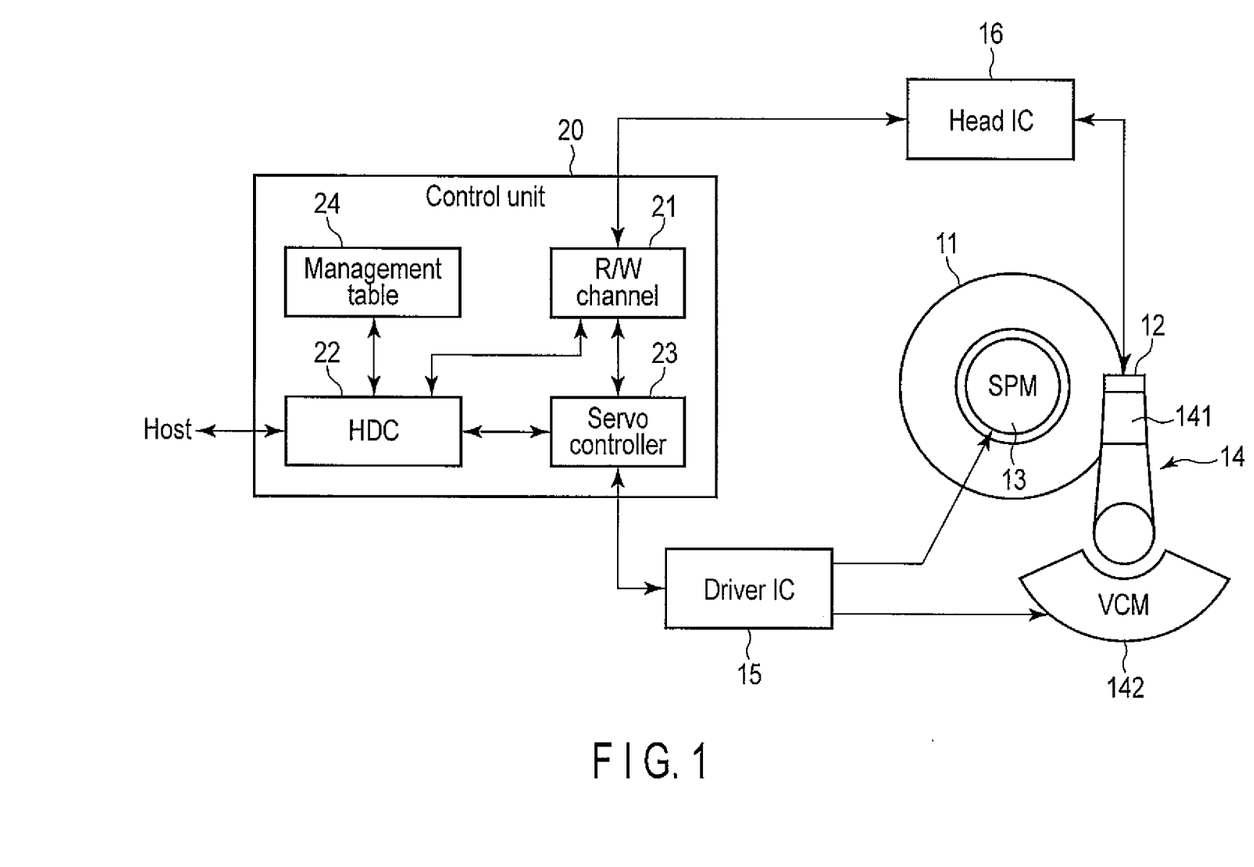
FIG. 1 is a block diagram showing an exemplary configuration of a magnetic disk drive according to an embodiment.

FIG. 1 is a block diagram showing an exemplary configuration of a magnetic disk drive according to an embodiment. A magnetic disk drive shown in FIG. 1 comprises a disk (magnetic disk) 11, a head (magnetic head) 12, a spindle motor (SPM) 13, an actuator 14, a driver IC 15, a head IC 16, and a control unit 20.

The disk 11 is a magnetic recording medium. The disk 11 comprises two disk surfaces, an upper surface and a lower surface. For example, the upper disk surface of the disk 11 serves as a recording surface on which data is magnetically recorded. The recording surface (recording area) of the disk 11 comprises, for example, concentric tracks. The recording surface of the disk 11 may comprise spirally arranged tracks. Each of the tracks comprises sectors. The sectors have respective unique physical addresses.

A head (head slider) 12 is arranged in association with the recording surface of the disk 11. The head 12 comprises a write element, a read element, and a heater element, none of which are shown in the drawings. The head 12 (more specifically, the write element and the read element) is used to write data to the disk 11 and read data from the disk 11. The heater element is heated by being supplied with power by the driver IC 15 under the control of the controller 18. The heater element thus thermally expands a portion of the head 12 which corresponds to the heater element, toward the recording surface side of the disk 11. This adjusts the gap between the head 12 and the recording surface of the disk 11, that is, the dynamic fly height (DFH) of the head 12. Hence, the heater element is also referred to as a fly control heater.

In the embodiment, optically assisted recording is applied to the magnetic disk drive in FIG. 1. Optically assisted recording is a type of energy assisted recording. In optically assisted recording, when the head 12 writes data, an area on the disk 11 to which the data is to be written is irradiated with a light beam. Thus, the magnetic disk drive in FIG. 1 comprises a light source (not shown in the drawings), for example, a semiconductor laser. The light source delivers a light beam according to a driving current (light source driving current) supplied by the driver IC 15 under the control of the controller 18. Any energy sources other than the one based on a light beam may be used for energy assisted recording.

The configuration shown in FIG. 1 assumes a magnetic disk drive comprising the single disk 11. However, the magnetic disk drive may comprise a plurality of stacked disks 11.

Furthermore, in the configuration in FIG. 1, one of the surfaces of the disk 11 serves as a recording surface. However, both surfaces of the disk 11 may serve as a recording surface, and heads may be arranged in association with the respective surfaces.

The disk 11 is rotated by the SPM 13 at a high speed. The SPM 13 is driven by a driving current (or driving voltage) supplied by the driver IC 15. The head (head slider) 12 is attached to the tip of an arm 141 of an actuator 14. The actuator 14 comprises a voice coil motor (VCM) 142 serving as a driving source for the actuator 14. The VCM 142 is driven by a driving current supplied by the driver IC 15. When the actuator 14 is driven by the VCM 142, this causes the head 12 to move over the disk 11 in the radial direction of the disk 11 so as to draw an arc.

The driver IC 15 drives the SPM 13 and the VCM 142 under the control of the control unit 20 (more specifically, a servo controller 23 in the control unit 20 which will be described below). The driver IC 15 also drives the heater element and the light source under the control of the control unit 20 (servo controller 23). The head IC 16, also referred to as a head amplifier, amplifies a signal read by the head 12 (that is, a read signal). The head IC 16 also converts write data output by the control unit 20 (more specifically, an R/W channel 21 in the control unit 20 which will be described below) into a write current and outputs the write current to the head 12.

The control unit 20 is implemented by a system LSI with a plurality of elements including a microprocessor unit (MPU) and integrated together on a single chip. The control unit 20 comprises a read/write (R/W) channel 21, a disk controller (hereinafter referred to as HDC) 22, a servo controller 23, and a management table 24.

The R/W channel 21 processes signals related to reading and writing. That is, the R/W channel 21 converts a read signal amplified by the head IC 16 into digital data, and decodes the digital data into read data. The R/W channel 21 also extracts servo data from the digital data. The R/W channel 21 further encodes write data transferred by the HDC 22 and transfers the encoded write data to the head IC 16.

The HDC 22 is connected to a host (host device) via a host interface. The host utilizes the magnetic disk drive shown in FIG. 1, as the host's own storage device. The host and the magnetic disk drive shown in FIG. 1 are provided in an electronic device such as a personal computer, a video camera, a music player, a mobile terminal, a mobile phone, or a printer device.

The HDC 22 functions as a host interface controller that transmits and receives signals to and from the host. Specifically, the HDC 22 receives commands (a write command, a read command, and the like) transferred by the host. The HDC 22 also controls the data transfer between the host and the HDC 22. The HDC 22 further functions as a disk interface controller that controls writing of data to the disk 11 and reading of data from the disk 11 via the R/W channel 21, the head IC 16, and the head 12.

The HDC 22 functions as a calibration module every time calibration is required for sequential writing typified by shingled writing. In this case, the HDC 22 arranges a calibration area on the disk 11 (more specifically, in an area on the disk 11 to which data is to be written next time), and uses the calibration area to perform the calibration. That is, the HDC 22 uses the calibration area to adjust a condition (write condition) that is used by the head to access the sectors on the disk 11 (for example, write access).

The management table 24 is stored in a storage area in a memory of the control unit 20. The management table 24 holds information that allows each of the sectors on the disk 11 to be associated with a unique physical address PA and a logical address LBA assigned to the physical address PA. The management table 24 also holds information associated with the physical addresses PA and indicating, for each physical address PA, whether the corresponding one of the sectors is a defect area (defect sector) that cannot be used for recording and/or reproduction (data writing and/or reading). The management table 24 further holds information associated with the physical addresses PA and indicating, for each physical address PA, whether the corresponding one of the sectors is a calibration area (calibration sector) used for calibration.

Figure 2:
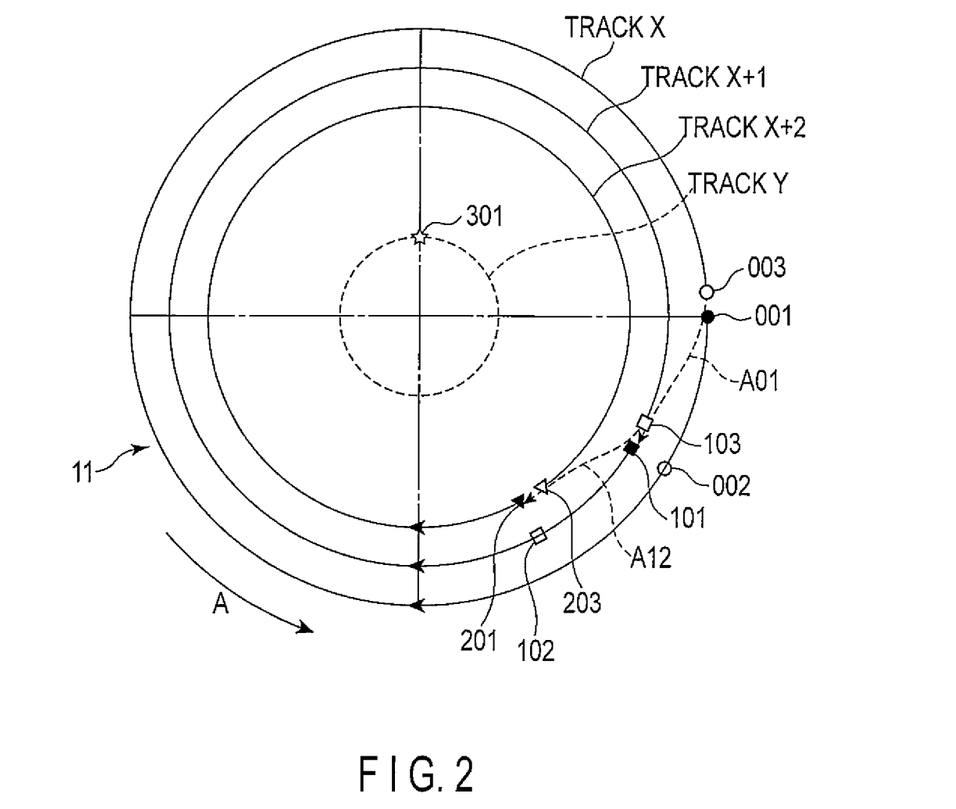
FIG. 2 is a diagram showing a write start position and a write end position for each of three tracks on a disk shown in FIG. 1, when data is sequentially written to the three tracks.

Now, an example of the relationship between sequential writing and a disk format indicative of a track arrangement on the disk 11 will be described with reference to FIG. 2; the relationship is applied in the embodiment. FIG. 2 shows an exemplary write start position and an exemplary write end position for each of three tracks X, X+1, and X+2 on the disk 11 shown in FIG. 1, and these positions are set when data is sequentially written to the three tracks X, X+1, and X+2. In FIG. 2, arrow A shows the direction of rotation of the disk 11.

In the example in FIG. 2, the data is sequentially written to the track X, the track X+1, and the track X+2 in this order (that is, in one radial direction of the disk 11). X, X+1, and X+2 are indicative of the track numbers (cylinder addresses) of the track X, the track X+1, and the track X+2. In the sequential writing, each seek operation for moving the head 12 to the next track requires a settling time for head movement and head positioning (that is, seek and positioning). Thus, the circumferentially relative locations (that is, the direction angles) of the write start positions on the tracks X, X+1, and X+2 are not the same but are gradually displaced from one another.

In the example in FIG. 2, data writing starts at a position 001 on the track X (more specifically, the sector at the position 001 on the track X) and progresses to a position 003 via a position 002. Then, as shown by arrow A01, the head 12 is moved from the track X to the track X+1 and positioned at a target position on the track X+1. After the settling time for seek and positioning, the subsequent data writing progresses from a position 101 to a position 103 via a position 102 on the track X+1. Then, after a settling time for further seek and positioning as shown by arrow A12, the subsequent data writing progresses from a position 201 to the vicinity of a position 203 on the track X+2. Thus, in the example in FIG. 2, the disk 11 comprises an area extending in the radial direction of the disk 11 and in which data is sequentially written in one direction.

Figure 3:
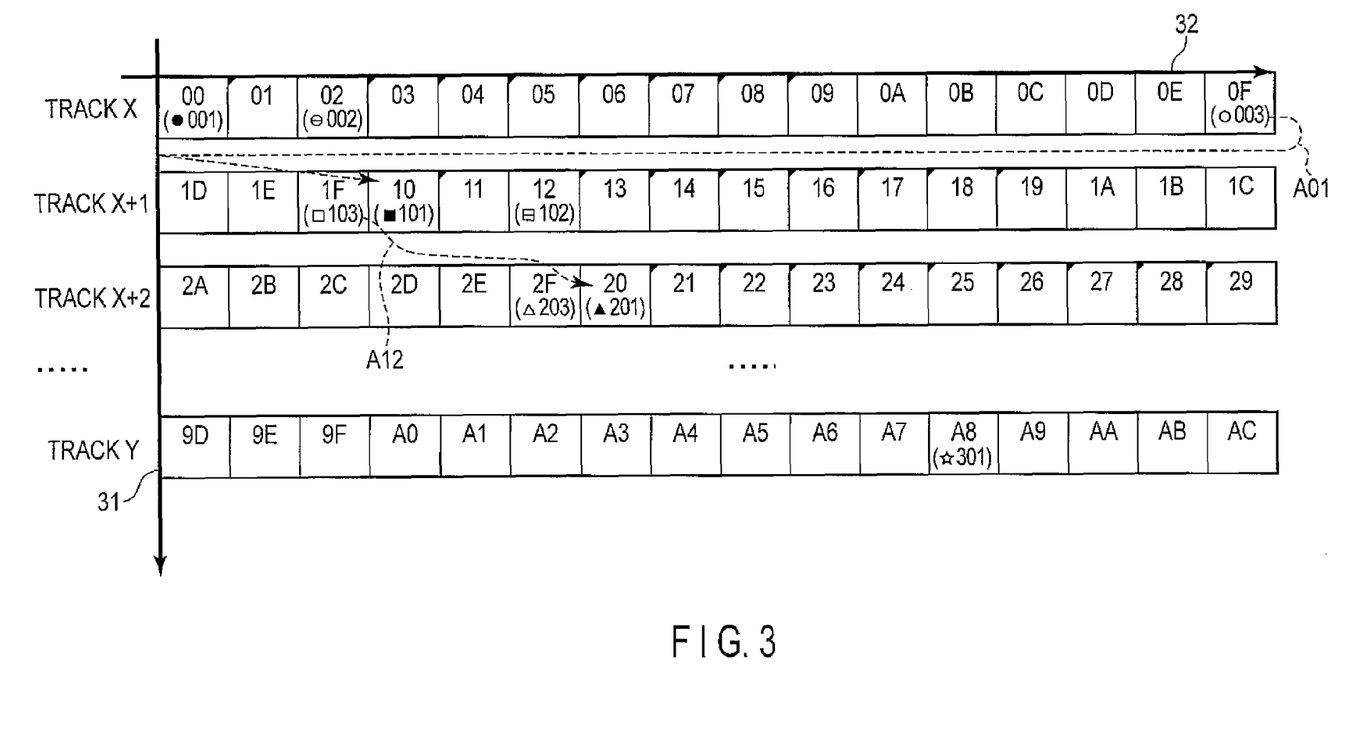
FIG. 3 is a schematic diagram showing the status of sequential writing shown in FIG. 2 in association with write positions on tracks and physical addresses.

Now, an example of the relationship between write positions on tracks and physical addresses in the sequential writing applied in the embodiment will be described with reference to FIG. 3. FIG. 3 is a schematic diagram showing the status of sequential writing shown in FIG. 2 in association with write positions on tracks and physical addresses. In FIG. 3, the axis of ordinate is indicative of the radial direction of the disk 11. A downward direction along the axis of ordinate (that is, the direction of arrow 31) is indicative of a radial direction toward the inner circumference of the disk 11. In FIG. 3, the axis of abscissas is indicative of a circumferential direction of the disk 11. A rightward direction along the axis of abscissas (that is, the direction of arrow 32) is indicative of a rotating direction (angular direction) of the disk 11. In FIG. 3, the concentric tracks are drawn linearly (that is, schematically) for convenience of drawing.

In the example illustrated in FIG. 3, the numbers of sectors in each of the tracks are the same. Here, for convenience of drawing, the number of sectors per track is assumed to be 0F (0x0F) in hexadecimal notation and 16 (0d16) in decimal notation. Outer circumferential tracks of the disk 12 (more specifically, the tracks in an outer circumferential zone) may comprise more sectors than inner circumferential tracks (more specifically, the tracks in an inner circumferential zone) as in the case of magnetic disk drives adopting constant density recording (CDR).

In FIG. 3, each of the sectors of the tracks has a physical address PA which is unique to the sector and which is used as a sector number. Furthermore, for the sectors corresponding to the positions 001 to 003, 101 to 103, 201, 203, and 301, the positions are shown in parentheses. The position 301 is on a track Y and the area of the track Y is not used to store user data therein but used as, for example, a system area. In the description below, a "sector with a physical address PA of x (corresponding to a position y) is expressed as a "sector at PA:x (position y)".

The sequential writing to the tracks X, X+1, and X+2 is executed as described below as is apparent from the description given with reference to FIG. 2. First, data writing starts in a sector at PA:00 (position 001) on the track X and progresses to a sector at PA:0F (position 003) via a sector at PA:02 (position 002). Then, after a settling time as shown by arrow A01, the subsequent data writing progresses from a sector at PA:10 (position 101) to a sector at PA:1F (position 103) via a sector at PA:12 (position 102) on the track X+1. Then, after a further settling time as shown by arrow A12, the subsequent data writing starts in a sector at PA:20 (position 201) and finally progresses to the vicinity of a sector at PA:2F (position 203) on the track X+2.

An area from PA:2B to PA:2F on the track X+2 is a spare area required for slip alternation (slip alternation area). That is, the embodiment applies the slip alternation to the sequential writing. The slip alternation is a technique in which if an abnormal sector (defect sector) is detected during sequential writing, the abnormal sector is marked in the management table and simply skipped, with the sequential writing continued. Thus, according to the embodiment, the disk 11 comprises the above-described spare area and a sequential access area of a second size to which data of a first size is sequentially written. The second size is larger than the first size.

Thus, the slip alternation is a technique specific to sequential writing and is disclosed in, for example, Japanese Patent No. 3206657. The slip alternation technique is different from a technique to assign a sector (alternative sector) in an alternative area secured at a particular radial position on the disk to a defect sector. The slip alternation technique allows elimination of the need for an operation of moving the head to a track (alternative track) with an alternative sector present therein and positioning the head over the alternative track. This enables an increase in the speed of the sequential writing.

Now, the write condition that is applied when the head 12 sequentially writes data to the disk 12 will be described. Examples of the write condition include a write current supplied to the write element (recording coil) of the head 12 (more specifically, a waveform profile of the effective and peak values of the write current) and power supplied to the heater element of the head 12 (what is called DFH power).

The value of the write current is used as a write condition concerning the capability of overwriting magnetization on the recording surface of the disk 11 and crosstalk into adjacent tracks. The supply of an increased write current to the write element improves the capability of overwriting the existing magnetization on the recording surface of the disk 11. This is expected to increase the signal-to-noise ratio (SNR), but may disadvantageously erase data recorded in the adjacent tracks or induce crosstalk. Thus, the write current needs to be adjusted.

The value of the DFH power is used as a condition concerning the dynamic fly height of the head 12. The value of the DFH power is used not only as a write condition but also as a read condition. The heater element of the head 12 (more specifically, the heater element installed inside the head 12), compared to surrounding structural materials, is expected to be thermally expanded by supplying increased DFH power to the heater element. This enables a reduction in the gap between the head 12 (more specifically, the write and read elements of the head 12) and the recording surface of the disk 11. In this case, SNR is expected to increase due to improved recording and reproduction resolution. However, the supply of more DFH power than necessary extremely reduces the dynamic fly height of the head 12, which comes into contact with the disk 11. This leads to dusting, damage to the disk 11, breakdown of the head 12, and the like. Thus, the DFH power needs to be adjusted.

Furthermore, the following may be calibrated: applied energy typified by the light source driving current and used for energy assisted recording typified by optically assisted recording, and the phase or frequency of a recording base clock for synchronous recording on the disk 11. The applied energy for the energy assisted recording is a condition related to the capability of overwriting the magnetization on the recording surface of the disk 11 and to the recording resolution. The application of increased energy enhances the capability of overwriting the existing recording magnetization on the recording surface of the disk 11. This is expected to increase the SNR, but may disadvantageously erase data recorded in the adjacent tracks, induce crosstalk, or reduce the recording and reproduction resolution. Thus, the driving current needs to be adjusted to the minimum required value.

Furthermore, the phase or frequency of the synchronous recording base clock used when synchronous recording is executed is a condition concerning the phase or frequency when a magnetization pattern is induced on the disk 11. The synchronous recording is typified by bit-patterned recording and refers to recording in which a position where a recording pattern is to be induced is predetermined on the disk 11. The synchronous recording also refers to recording in which the phase or frequency of a magnetization pattern to be recorded is synchronized with that of a magnetization pattern already recorded in the adjacent track. To ensure synchronous accuracy and probability for such recording, the phase or frequency of the recording base clock needs to be adjusted.

The above-described calibrations have the following three common characteristics. A first characteristic is that the calibrations are difficult to execute simultaneously with, for example, an actual data write operation. A second characteristic is that the calibrations require execution of an operation equivalent to an actual data write operation or an actual assist operation. A third characteristic is that execution of the calibration may lead to a change in the magnetization state of the disk 11 for magnetic recording, that is, destruction of data already written in an area on the disk 11 used for the calibration or recording of undetermined data irrelevant to already-written data.

In view of the above-described characteristics, the area on the disk 11 used for the calibration (that is, the calibration area) is preferably managed separately from an area (that is, a user area) for actual (that is, normal) data writing. Thus, a part of an area that is not used for actual data writing, for example, a part of the system area on the disk 11, may be used as a dedicated calibration area. Such a calibration area may be, for example, an area at the position 301 on the track Y in FIG. 1, which corresponds to PA:48 in FIG. 2. Alternatively, a part of the area that is used for actual data writing may be used as a dedicated calibration area. In this case, the dedicated calibration area is managed as an area outside the user area.

However, the technique using the dedicated calibration area is difficult to adopt in terms of the following two points. A first point is that it is difficult to define the distance between a position on the disk 11 for actual data writing (writing/reading) and the position of the dedicated calibration area (that is, the distance fails to be determined). Thus, the user area may be divided into a plurality of zones (partial areas) in the radial direction of the disk 11 so that a part of each of the zones is used as a dedicated calibration area. However, the size of the user area and thus recording density efficiency decrease consistently with the number of zones, that is, the ratio of the calibration areas arranged in the radial direction thereof the disk 11 to the user area. Thus, if a part of the user area is used as dedicated calibration areas, the arrangement ratio of the dedicated calibration areas to the user area needs to be set equal to or smaller than a given value. Setting the arrangement ratio equal to or smaller than a given value may vary the distance (or relationship) between the position on the disk 11 for actual data writing (writing/reading) and the position of the calibration area. That is, even with a part of the user area used as dedicated calibration areas, defining the above-described distance is difficult.

In this situation, depending on a calibration condition, for example, the optimum recording condition (write condition) resulting from the calibration may differ from that for the position at which data is actually recorded (written). A specific example will be described. The speed of heat radiation from the head to surroundings is correlated with the relationship between recording quality and the driving current for the light source in the optically assisted recording or the power for the fly control heater; the relationship is a thermal condition. The heat radiation speed depends on the relative speed of the head 12 and the disk 11. Thus, if the radial position on the disk 11 where the head 12 travels varies between the calibration area and the actual recording area, the optimum condition naturally varies.

A second point is that every execution of calibration involves a long wait time (settling time) during which the head 12 is moved to the track with the calibration area located therein and is then positioned at the target position on the track. That is, since the radial position on the disk 11 in the calibration area is different from that in the recording area, the head 12 needs to be moved between the calibration area and the recording area. The time required to move the head 12 (and position the head 12) is a factor that reduces the speed of the data write process according to the frequency of calibration during the data write process.

Thus, a first point of the embodiment is another characteristic common to the calibrations (hereinafter referred to as a first characteristic). The first characteristic is that a change in the state of an area on the disk 11 which is effected by calibration can be restored by rewriting. A second point of the embodiment is a characteristic of the slip alternation technique specific to sequential writing (hereinafter referred to as a second characteristic). The second characteristic is that if a defect occurs during sequential writing, the defect sector is simply skipped and the sequential writing is continued without disrupting the sequence of physical positions relative to the sequence of logical positions.

The first characteristic indicates that a calibration area at a certain point of time can be utilized as a recording area (or recording/reproduction area) at any subsequent point of time. Thus, more specifically, the first point is that the user area need not be partly used as a dedicated calibration area and that the position of the calibration area can be dynamically changed within the user area.

The second characteristic indicates that even if a defect sector is detected during sequential writing, the head 12 need not be moved in the radial direction of the disk 11. Thus, more specifically, the second point is that during sequential writing, even when a calibration area is inserted at any position, the head 12 need not be moved in the radial direction of the disk 11.

The embodiment adopts a method for arranging and managing a calibration area based on the above-described first and second points. The method will be described below with reference to the drawings. First, the management table 24 applied in the embodiment will be described with reference to FIG. 4. In the description below, for further simplification, the sector (area) at "PA:x" is simply expressed as "PA:x".

Figure 4:
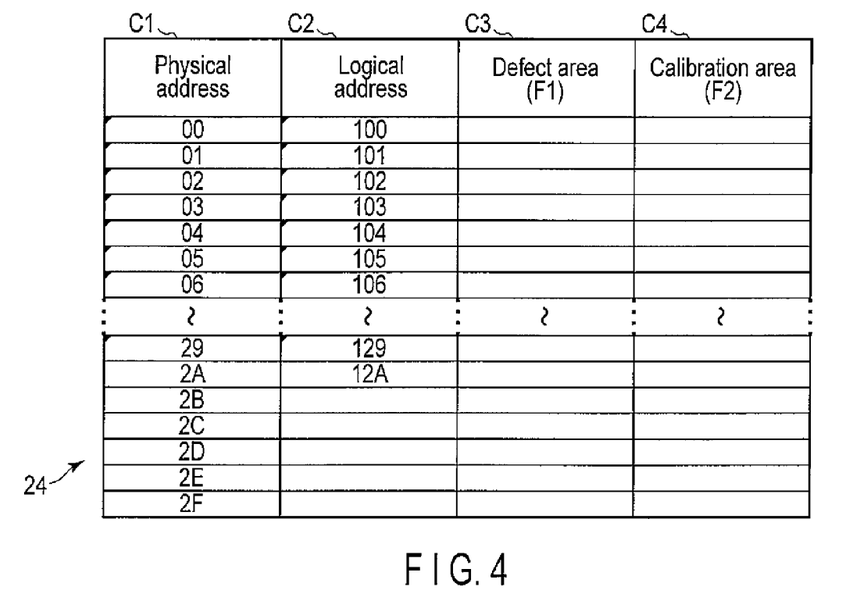
FIG. 4 is a diagram showing an example of the data structure of a management table applied in the embodiment and a first state of the management table.

FIG. 4 illustrates an example of the data structure of the management table 24 and a first state of the management table 24. As shown in FIG. 4, the management table 24 comprises columns C1, C2, C3, and C4 with respective column headings "physical address (PA)", "logical address (LBA)", "defect area", and "calibration area set therefor. The rows in the management table 24 are associated with the sectors on the disk 11.

In the management table 24, sections (that is, fields) of each of the rows which correspond to the columns C1 and C2 are used to hold the physical address (that is, the positional information on the physical position) PA of the sector corresponding to the row and the logical address LBA (that is, the logical address LBA assigned to the physical address PA). Thus, in the management table 24, the fields of each of the rows which correspond to the columns C1 and C2 are referred to as a physical address field C1 and a logical address field C2.

In the embodiment, in the management table 24, the column C1 has consecutive physical addresses PA set in order of increasing address. In the management table 24, fields of each of the rows which correspond to the columns C3 and C4 are used to hold information (for example, flag information) F1 indicating whether the sector corresponding to the row is a defect area (defect sector) and information (for example, flag information) F2 indicating whether the sector corresponding to the row is a calibration area. Thus, the fields of each of the rows which correspond to the columns C3 and C4 are referred to as a defect area field C3 and a calibration area field C4. In the embodiment, a flag F1 of "1" indicates that the corresponding sector is a defect area. A flag F2 of "1" indicates that the corresponding sector is a calibration area.

In the management table 24 shown in FIG. 4, the column C1 has consecutive physical addresses PA ranging from "00" to "2F" and set in order of increasing address. The area within this range on the disk 11 is the above-described sequential access area of the second size. Furthermore, within this range, an area with physical addresses PA ranging from "00" to "2A" on the disk 11 as described with reference to FIG. 3 (the area is hereinafter referred to as the area from "00" to "2A") is the area to which data of the first size is actually sequentially written as described above. An area with the remaining physical addresses PA ranging from "2B" to "2F" is the above-described spare area. However, in the embodiment, if a defect area or a calibration area is included in the area from "00" to "2A", sequential writing skips the defect area or the calibration area and progresses into the spare area.

In the management table 24 shown in FIG. 4, neither a defect area field C3 with a flag F1 of "1" nor a calibration area field C4 with a flag F2 of "1" is present. That is, FIG. 4 shows the state of the management table 24 observed when the area from "00" to "2A" includes neither a defect area nor a calibration area. This corresponds to the above-described first state.

In this case, a range of consecutive logical addresses LBA to which data is sequentially written, for example, the logical addresses "100" to "12A", are assigned to the physical addresses "00" to "2A". Thus, in the management table 24 shown in FIG. 4, the logical addresses "100" to "12A" are set for the logical address fields C2 corresponding to the physical address fields C1 with the physical addresses PA "00" to "2A" set therein.

Figure 5:
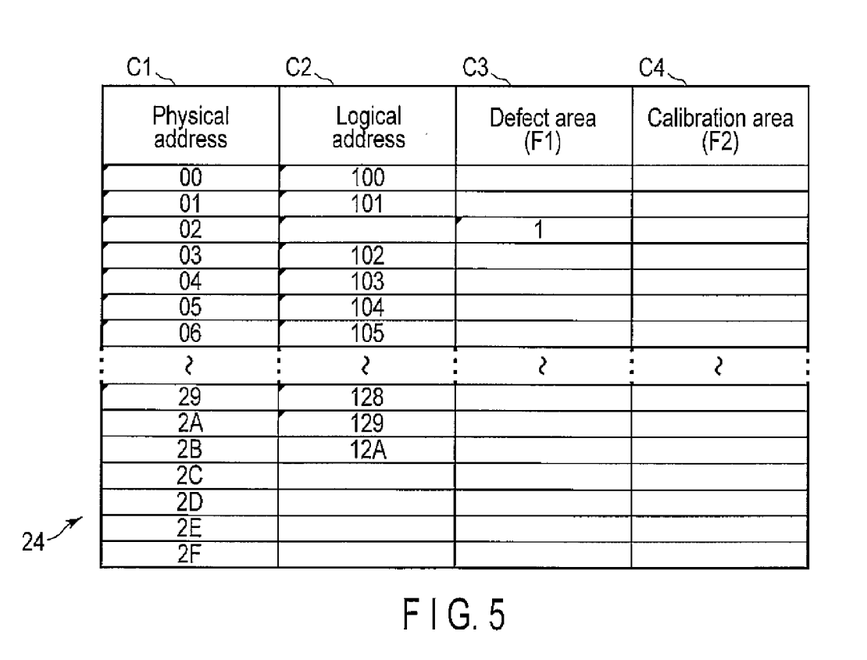
FIG. 5 is a diagram showing an example of the data structure of the management table applied in the embodiment and a second state of the management table.

FIG. 5 illustrates an example of the data structure of the management table 24 and a second state of the management table 24. In the management table 24 shown in FIG. 5, "1" (F1=1) is set in the defect area field C3 corresponding to the row with the physical address field C1 with a physical address PA of "02" set therein.

In the embodiment, slip alternation is applied to sequential writing, and if any sector is entered as a defect area, the sector is skipped, with the sequential writing continued. Thus, the moment PA:02 is entered as a defect area, the physical addresses to which the logical addresses LBA "102" to "12A" associated with PA:02 to PA: 2A are assigned are each slipped by one address in a direction in which the physical address increases. That is, the logical addresses LBA "102" to "12A" assigned to PA:02 to PA: 2A are reassigned to PA:03 to PA: 2B, respectively. Thus, in the management table 24, the logical addresses LBA "102" to "12A" set in the column C2 are reentered so as to be each shifted backward by one address within the column C2 and are associated with PA:03 to PA: 2B, respectively. PA: 2B is a sector in the spare area. Hence, the management table 24 shown in FIG. 5 is in the state in which PA:02 is entered as a defect area and in which the logical addresses LBA "102" to "12A" are correspondingly reassigned. This corresponds to the above-described second state.

Figure 6:
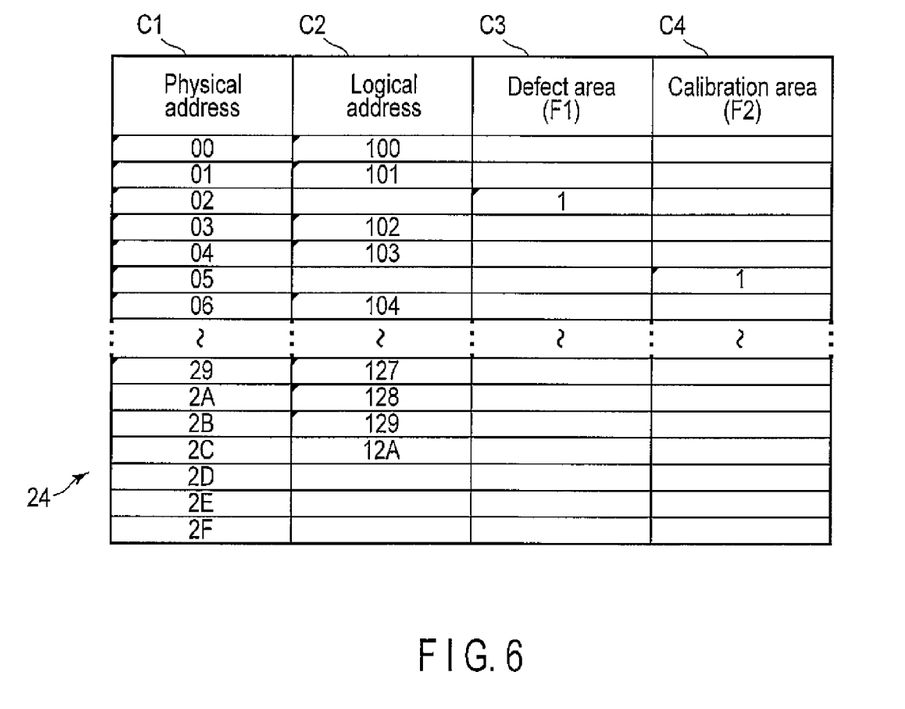
FIG. 6 is a diagram showing an example of the data structure of the management table applied in the embodiment and a third state of the management table.

FIG. 6 illustrates an example of the data structure of the management table 24 and a third state of the management table 24. In the management table 24 shown in FIG. 6, as is the case with the state of the management table 24 shown in FIG. 5, "1" (F1=1) is set in the defect area field C3 corresponding to the row with the physical address field C1 with a physical address PA of "02" set therein. In this state, the logical addresses LBA "102" to "12A" are reassigned to PA:03 to PA: 2B, respectively (see FIG. 5). In addition, in the management table 24 shown in FIG. 6, "1" (F2=1) is set in the calibration area field C4 corresponding to the row with the physical address field C1 with a physical address PA of "05" set therein.

In the embodiment, even if any sector is entered as a calibration area during sequential writing, the sector is skipped, with the sequential writing continued. Thus, the moment PA:05 is entered as a calibration area, the physical addresses to which the logical addresses LBA "104" to "12A" (see FIG. 5) associated with PA:05 to PA: 2B are assigned are each slipped by one address in the direction in which the physical address increases. That is, the logical addresses LBA "104" to "12A" assigned to PA:05 to PA: 2B are reassigned to PA:06 to PA: 2C, respectively. Thus, in the management table 24, the logical addresses LBA "104" to "12A" set in the column C2 are reentered so as to be each shifted backward by one address within the column C2 and are associated with PA:06 to PA: 2C, respectively. That is, after the second state shown in FIG. 5, the management table 24 in FIG. 6 is in the state in which PA:05 is entered as a calibration area and in which the logical addresses LBA "104" to "12A" are correspondingly reassigned. This corresponds to the above-described third state.

In the embodiment, during sequential writing, the position of PA:05 entered in the management table 24 as a calibration area (that is, the physical position where a calibration area is arranged) is adjacent to the positions of PA:04 and PA:06 to which data is actually written before and after the entry (arrangement) (more specifically, the position of PA:05 is adjacent to the positions of PA:04 and PA:06 in the circumferential direction of the disk 11). Thus, before and after the arrangement of a calibration area, the distance between the calibration area and the area to which data is actually written can be set to a small value within a given range. This will be described in further detail.

First, as shown in FIG. 3, PA:05 is positioned on the track X shown in FIG. 2. That is, as is apparent from FIG. 2 and FIG. 3, PA:05 and the adjacent PA:04 and PA:06 are present on the same radius (track X) of the disk 11. Thus, during sequential writing, the head 12 need not be moved when the HDC 22 utilizes PA:05 as a calibration area to execute calibration after data is written to PA:04 (that is, PA:04 to which "103" is assigned as LBA). The head 12 also need not be moved when the HDC 22 restarts the sequential writing at PA:06 (that is, PA:06 to which the succeeding "104" is assigned) after the execution of calibration.

Regardless of the timing when calibration is required during sequential writing, the above-described effect is reliably exerted by arranging the calibration area in the sector to which data is to be written next time (the sector is hereinafter referred to as the next sector). That is, according to the embodiment, regardless of whichever sector within the area to which data is sequentially written corresponds to the next sector, the above-described effect is exerted by entering the next sector in the management sector 24 as a calibration area and skipping the next sector while continuing the sequential writing.

Now, the reason why the calibration area is not managed as a defect area will be described. For example, PA:05 entered in the management table 24 shown in FIG. 6 as a calibration area may have its state changed not only to a defect area but also to a normal recording area (that is, a data write area) at any subsequent point of time. This is because the change in the state of PA:05 (that is, PA:05 on the disk 11) which is effected by the calibration can be restored by rewriting data to PA:05. On the other hand, some defect areas can be restored, but not all the defect areas are guaranteed to be able to be restored. In general, the defect area is permanently out of use or is prevented from having its state changed to a data write area until the defect area is determined to have been corrected through sufficient rewrite and read tests. As described above, the defect area is different from the calibration area in a change condition for a state change. Thus, according to the embodiment, in the management table 24, the calibration area and the defect area are distinctively managed as separate areas.

However, the embodiment distinctively manages the calibration area and the defect area but does not intend to deny the possibility of using the defect area as a calibration area. For example, calibration that does not involve a magnetization process executed on a calibration area can utilize a defect area as the calibration area. An example of such calibration is executed by detecting the intensity of a light source applied to optically (thermally) assisted recording using a photodetector built in the head.

In this example, thermal fluctuation occurs in the calibration area as assisted energy is applied to the calibration area. The thermal fluctuation may destroy data written to the calibration area. However, the calibration itself can be sufficiently achieved without reproducing the magnetized state of the calibration area (that is, the magnetized state on the disk 11), namely, the calibration can be sufficiently achieved simply by observing the light source intensity using the photodetector and without reading data from the calibration area. Thus, depending on the type of the calibration, even a defect area that cannot be used for recording of data can be used for the calibration. Therefore, the defect area can be used as the calibration area. For the calibration that can be executed using a "defect area" as a "calibration area", the defect area may be entered in both the defect area field C3 and calibration area field C4 of the management table 24 or only in the defect area field C3.

Figure 7:
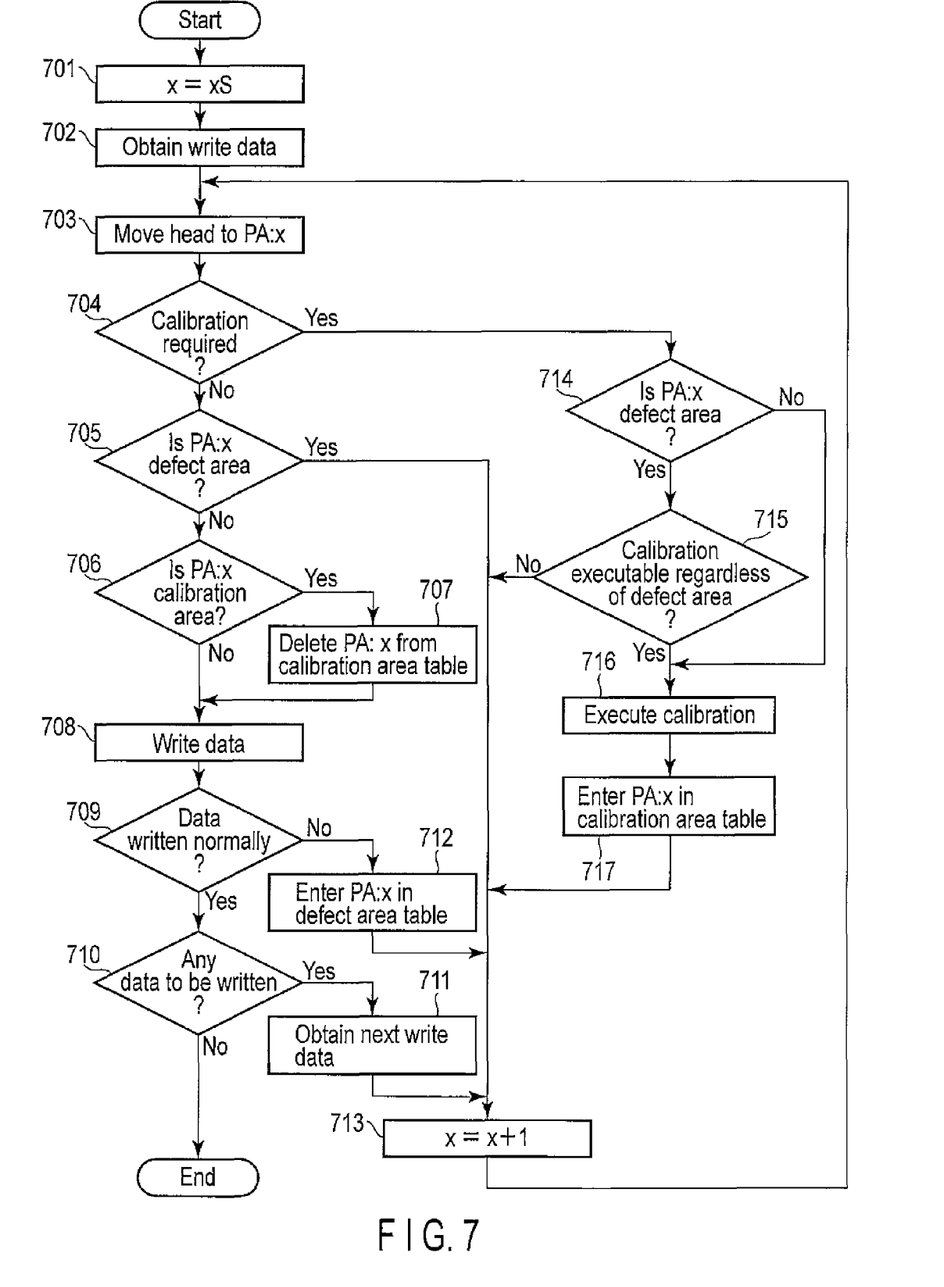
FIG. 7 is a flowchart illustrating an exemplary procedure for sequential writing in conjunction with the arrangement of a calibration area applied in the embodiment.

Now, an exemplary procedure for sequential writing involving the arrangement (that is, the assignment) of a calibration area applied in the embodiment will be described with reference to a flowchart in FIG. 7. It is assumed that the host requests the magnetic disk drive shown in FIG. 1 to write data (data of the first size) to a logical address space (logical address space of the first size) with the consecutive logical addresses LBA within the above-described range from "100" to "12A" (that is, this writing corresponds to sequential writing). The logical addresses LBA "100" and "12A" are a start logical address zS and an end logical address zE for the sequential writing, respectively. In the embodiment, the logical address LBA "12A" is assigned to an area (sector) with a physical address PA of "00" on the disk 11, that is, to PA:00.

In response to the above-described write request from the host, the HDC 22 of the control unit 20 in the magnetic disk drive shown in FIG. 1 executes the sequential writing as follows. First, the HDC 22 functions as a sequential write module and initially sets x that is indicative of the physical address PA of the area to which data is to be written to the start physical address xS for the sequential writing (block 701). In block 701, the HDC 22 initially sets z that is indicative of the logical address LBA of the area to which data is to be written to the start logical address zS for the sequential writing. In the embodiment, the start physical address xS is "00", and the start logical address zS is "100".

Then, the HDC 22 obtains data (write data) to be written to PA:x (LBA:z) from the host (block 702). In block 702, the HDC 22 temporarily stores the data obtained from the host in a buffer (not shown in the drawings) formed of a memory such as a dynamic RAM (DRAM). For simplification of description, the embodiment assumes that write data corresponding to PA:x (LBA:z) is obtained from the host every time PA:x is set. However, the configuration may be such that at the beginning of the sequential writing, the data to be written to the address space ranging from "100" to "12A" is obtained from the host.

Then, the HDC 22 allows the servo controller 23 to move the head 12 to PA:x (block 703). Before writing the data to PA:x, the HDC 22 functions as a calibration module and determines whether any calibration is required in connection with the write condition (block 704).

If no calibration is required (No in block 704), the HDC 22 proceeds to block 705. In block 705, the HDC 22 functions as a sequential write module again and determines whether PA:x is a defect area with reference to the management table 24. More specifically, the HDC 22 determines whether PA:x is entered as a defect area (that is, whether PA:x is associated with a defect area) depending on whether, in the management table 24, "1" (F1=1) is set in the defect area field C3 on the same row as that with the physical address field C1 with x set therein. In the description below, the entry of PA:x in the management table 24 as a defect area is expressed as the entry of PA:x in a defect area table.

If PA:x is not a defect area (No in block 705), the HDC 22 proceeds to block 706. In block 706, the HDC 22 references the management table 24 again to determine whether PA:x is a calibration area (that is, whether a calibration area is arranged at PA:x). More specifically, the HDC 22 determines whether PA:x is entered as a calibration area (that is, whether PA:x is associated with a calibration area) depending on whether, in the management table 24, "1" (F2=1) is set in the calibration area field C4 on the same row as that with the physical address field C1 with x set therein. In the description below, the entry of PA:x in the management table 24 as a calibration area is expressed as the entry of PA:x in a calibration area table.

If PA:x is a calibration area (Yes in block 706), that is, if PA:x is an area utilized for calibration, the HDC 22 functions as a manager and deletes the entry of PA:x from the calibration area table (block 707). More specifically, in the management table 24, the HDC 22 resets, for example, to "0", the value "1" set in the calibration area field C4 on the same row as that with the physical address field C1 with x set therein. This recovers PA:x from the calibration area to a normal data write area. Thus, the HDC 22 functions as a sequential write module and allows the head 12 to write data to PA:x (that is, PA:x recovered from the calibration area to the normal data write area) via the R/W channel 21 and the head IC 16 (block 708). In contrast, if PA:x is not a calibration area (No in block 706), that is, if PA:x is neither a defect area nor a calibration area (No in blocks 705 and 706), the HDC 22 skips block 707 and writes the data to PA:x (block 708).

Then, the HDC 22 determines whether the writing has been normally executed (block 709). If the writing has been normally executed (Yes in block 709), the HDC 22 determines whether there remains data to be written (block 710). If there remains data to be written (Yes in block 710), that is, if the sequential writing has failed to reach the end logical address zE, the HDC 22 proceeds to block 711. In block 711, the HDC 22 obtains the next write data from the host. The HDC 22 then increments x by one (block 713). In block 713, the HDC 22 also increments z by one. The HDC 22 then returns to block 703. In block 703, the HDC 22 allows the servo controller 23 to move the head to PA:x specified by x after the incrementation (that is, PA:x corresponds to the sector next to the one where the head 12 is currently positioned).

On the other hand, if the writing has failed to be normally executed (No in block 709), the HDC 22 determines PA:x to be a defect area. Thus, the HDC 22 functions as a manager and enters PA:x in the defect area table (block 712). More specifically, in the management table 24, the HDC 22 sets "1" (F1=1) in the defect area field C3 on the same row as that with the physical address field C1 with x set therein. the HDC 22 then increments x by one (block 713).

At this time, unlike in the case of block 713, z is not incremented. Block 713 (that is, block 713 executed following block 712) allows the sector entered as a defect area in block 712 to be skipped. In this case, in the embodiment, in which the logical address LBA assigned to x (physical address PA) before the incrementation is z, the physical addresses to which the logical addresses z to zE with the sequential writing not completed thereon are assigned are each slipped by one address in the direction in which the physical address increases.

Upon carrying out block 713, the HDC 22 returns to block 703. If any one of the sectors from z to zE is zi that is assigned to a defect area or a calibration area, the physical addresses to which the logical addresses zi to zE are assigned are further slipped.

Furthermore, if PA:x is a defect area (Yes in block 705), the HDC 22 skips blocks 706 to 712 and proceeds to the above-described block 713. In block 713, the HDC 22 increments x by one. Block 713 allows the sector determined to be a defect area in block 705 to be skipped. At this time, z is not incremented and the sectors from z to zE are not reassigned. Upon carrying out block 713, the HDC 22 returns to block 703. In block 703, the HDC 22 allows the servo controller 23 to move the head to PA:x specified by x after the incrementation (that is, PA:x corresponds to the next sector) as described above. Then, the HDC 22 determines whether any calibration is required in connection with the write condition (block 704).

If any calibration is required (Yes in block 704), the HDC 22 proceeds to block 714. In block 714, the HDC 22 functions as a calibration module and determines whether PA:x is a defect area, as is the case with the above-described block 705. If PA:x is a defect area (Yes in block 714), the HDC 22 determines whether the required calibration can be executed regardless of the defect area (block 715).

If the required calibration can be executed regardless of the defect area (Yes in block 715), the HDC 22 utilizes PA:x (that is, the defect area) as a calibration area (that is, without skipping PA:x) to execute the calibration (block 716). That is, the HDC 22 arranges a calibration area at PA:x (defect area), and executes the calibration using the arranged calibration area. An example of the calibration involving an affirmative determination in block 715 is a calibration with no magnetization process executed on the calibration area as described above.

On the other hand, if PA:x is not a defect area (No in block 714), the HDC skips block 715 and proceeds to block 716. In block 716, the HDC 22 executes calibration utilizing PA:x where the head 12 is currently positioned as a calibration area (that is, PA:x is a non-defect area).

Thus, in the embodiment, when calibration is required during sequential writing, the sector where the head 12 is positioned to write data to the sector is used as a calibration area. Thus, the embodiment eliminates the need to move the head 12 for calibration, thus preventing the position of a calibration area from affecting sequential writing (sequential access).

Upon carrying out block 716, the HDC 22 functions as a manager and enters PA:x in the calibration area table (block 717). More specifically, in the calibration area table, the HDC 22 sets "1" (F2=1) in the calibration area field C4 on the same row as that with the physical address field C1 with x set therein. The HDC 22 then increments x by one (block 713). Block 713 allows the sector entered as a calibration area in block 717 to be skipped. At this time, z is not incremented. Furthermore, if PA:x is determined not to be a defect area in block 714, then depending on the entry of PA:x in the calibration area table, the physical addresses to which the logical addresses z to zE are assigned are each slipped by one address in the direction in which the physical address increases. That is, the sectors from z to zE are reassigned.

Upon carrying out blocks 716 and 717 and then block 713, the HDC 22 allows the servo controller 23 to move the head to PA:x specified by x after the incrementation (block 703) in order to write the data under the optimum write condition resulting from the calibration. PA:x (sector) specified by x after the incrementation is the sector next to the one where the head 12 is currently positioned.

As described above, according to the embodiment, the sector next to the one used as a calibration area for sequential writing is used as the sector to which the data is to be written next time (that is, this sector is a data write area). Thus, according to the embodiment, movement of the head 12 from the calibration area to the data write area involves less settling time than that described above in connection with the second point. This enables the position of the calibration area to be prevented from affecting the sequential writing.

On the other hand, if the required calibration cannot be executed with the defect area (No in block 715), the HDC 22 proceeds to block 713 to increment x by one. Block 713 allows the defect area to be skipped. At this time, z is not incremented and the sectors from z to zE are not reassigned. Upon carrying out block 713, the HDC 22 returns to block 703.

Subsequently, when there remains no data to be written (No in block 710), the HDC 22 ends the sequential writing. The above-described sequential writing is also applicable to a case where data is sequentially read from an area Z1 on the disk 11 in which data has been sequentially written and where the read data is sequentially written to another area Z2 on the disk 11. The above-described sequential writing is also applicable to a case where the read data is partly replaced with write data from the host and where the data resulting from the replacement is sequentially written to the area Z2.

The structure of the management table 24 is not limited to the embodiments as described below. In general, the management table is used to manage the state by describing objects A and B in association with each other. The description of definition of the range of the objects is roughly classified into a vector type, in which an area is described based on the address of the start point and the size of the object B corresponding to those of the object A, and a scalar type, in which an area is described as a series of one-to-one relations between the addresses of the minimum units of the objects A and B. The management table 24 applied in the embodiment is implemented using the scalar type description. However, instead of the management table 24, a table may be used to which the vector type description is applied.

Furthermore, the management table 24 applied in the embodiments comprises a single table with the four columns C1 to C4. However, the management table 24 may comprise a set of a plurality of tables each with less than four columns (these tables are hereinafter referred to as sub-tables). For example, the management table 24 may comprise a first sub-table with the columns C1 and C2, a second sub-table with the columns C1 and C3, and a third sub-table with the columns C1 and C4, or may comprise a first sub-table with the columns C1 and C3 and a second sub-table with the columns C1 and C4. That is, the management table 24 may comprise a physically single table or a set of physically plural tables (sub-tables) provided that, in regard to the area on the disk 11 which is available for sequential writing, physical addresses are associated with logical addresses, a defect area is associated with a physical address, and a calibration area is associated with a physical address.

Additionally, in the embodiment, data is concentrically written to the disk 11 by the head 12. However, the data may be spirally written to the disk 11. Moreover, the above-described sequential writing can be applied to a disk drive other than the magnetic disk drive, for example, an optical disk drive.

At least one of the embodiments can provide a disk drive that enables the position of a calibration area to be prevented from affecting sequential access, and a method for arranging and managing the calibration area in the disk drive.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A disk drive comprising:
a disk comprising a sequential access area where data of a first size is sequentially written, the sequential access area comprising a second size larger than the first size;
a head configured to concentrically or spirally write data to the disk;
a management table configured to associate a calibration area with a physical address of the calibration area, the calibration area configured to calibrate a write condition for writing data to the disk using the head;
a calibration module configured to calibrate the write condition using a first area as the calibration area when calibration is required, the first area configured to be where data is written next,
a manager configured to manage a state where the first area is used as the calibration area to enter the calibration area in the management table in association with a physical address of the first area, and to delete an entry of the first area as the calibration area from the management table when the calibration is not required and when use of the first area as the calibration area has been entered in the management table; and
a sequential write module configured to skip the first area used as the calibration area and to use the head to sequentially write from a second area, the second area following the first area in the sequential access area.

2. The disk drive of claim 1, wherein:
the management table is further configured to associate a defect area in the sequential access area with a physical address of the defect area; and
the calibration module is further configured:
to determine whether the first area is a defect area based on the management table when the calibration is required, and
to use the first area as the calibration area when the first area is not the defect area.

3. The disk drive of claim 2, wherein the calibration module is further configured:
to determine whether the calibration is possible based on a type of the calibration when the first area is the defect area, and
to use the first area as the calibration area when the calibration is possible.

4. The disk drive of claim 3, wherein:
the sequential write module is further configured to skip the first area when the calibration is not possible;
the calibration module is further configured to determine that the second area is a candidate for the calibration area; and
the sequential write module is further configured to skip the second area when the second area is used as the calibration area and to sequentially write from a third area, the third area following the second area in the sequential access area.

5. The disk drive of claim 1, wherein:
the data of the first size is configured to correspond to consecutive logical addresses in a logical address space of the first size; and the management table is further configured to associate the consecutive logical addresses with physical addresses belonging to a physical address space in the sequential access area.

6. A method for arranging and managing a calibration area in a disk drive, the method comprising:
calibrating a write condition using a first area as a calibration area when calibration is required, the first area configured to be where data is written next;
managing a state where the first area is used as the calibration area and entering the calibration area in the management table in association with a physical address of the first area;
continuing sequential writing using a head from a second area by skipping the first area used as the calibration area, the second area following the first area in a sequential access area; and
deleting an entry of the first area as the calibration area from the management table when the calibration is not required and when use of the first area as the calibration area has been entered in the management table.

7. The method of claim 6, wherein:
the management table is further configured to associate a defect area in the sequential access area with a physical address of the defect area; and
the method further comprises:
determining whether the first area is a defect area based on the management table when the calibration is required, and
using the first area as the calibration area when the first area is not the defect area.

8. The method of claim 7, further comprising:
determining whether the calibration is possible based on a type of the calibration when the first area is the defect area; and
using the first area as the calibration area when the calibration is possible.

9. The method of claim 8, further comprising:
skipping the first area when the calibration is not possible;
determining that the second area is a candidate for the calibration area; and
continuing sequential writing from a third area by skipping the second area when the second area is used as the calibration area, the third area following the second area in the sequential access area.

10. The method of claim 6, wherein:
the data of the first size is configured to correspond to consecutive logical addresses in a logical address space of the first size; and
the management table is further configured to associate the consecutive logical addresses with physical addresses belonging to a physical address space in the sequential access area.

11. The disk drive of claim 1, wherein:
the calibration module is further configured to determine whether the calibration is possible based on a type of the calibration when the first area is a defect area;
the sequential write module is further configured to skip the first area when the calibration is not possible;
the calibration module is further configured to determine that the second area is a candidate for the calibration area; and
the sequential write module is further configured to skip the second area when the second area is used as the calibration area and to sequentially write from a third area, the third area following the second area in the sequential access area.

12. The method of claim 6, further comprising:
determining whether the calibration is possible based on a type of the calibration when the first area is a defect area;
skipping the first area when the calibration is not possible;
determining that the second area is a candidate for the calibration area; and
continuing sequential writing from a third area by skipping the second area when the second area is used as the calibration area, the third area following the second area in the sequential access area.

* * * * *